United States Patent
Zhou

(10) Patent No.: US 6,678,325 B1
(45) Date of Patent: Jan. 13, 2004

(54) METHOD OF IMPROVED CONTOUR CODING OF IMAGE SEQUENCES, AND APPLICATION

(75) Inventor: Minhua Zhou, Plano, TX (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,035

(22) PCT Filed: Sep. 18, 1998

(86) PCT No.: PCT/DE98/02772

§ 371 (c)(1),
(2), (4) Date: Jun. 4, 2000

(87) PCT Pub. No.: WO99/21366

PCT Pub. Date: Apr. 29, 1999

(30) Foreign Application Priority Data

Oct. 22, 1997 (DE) .......................... 197 46 611

(51) Int. Cl.$^7$ ................................. H04N 7/12
(52) U.S. Cl. ............... 375/240.08; 375/240.15
(58) Field of Search ........... 375/240.08, 240.11, 375/240.1, 240.12, 240.13, 240.14, 240.15; 348/416.1; 382/243, 238; 386/109, 111

(56) References Cited

U.S. PATENT DOCUMENTS

| | | | | |
|---|---|---|---|---|
| 5,317,397 A | | 5/1994 | Odaka et al. ............ | 348/416.1 |
| 5,642,166 A | * | 6/1997 | Shin et al. ................ | 348/416 |
| 5,978,510 A | * | 11/1999 | Chung et al. ............. | 382/238 |
| 6,026,195 A | * | 2/2000 | Eifrig et al. .............. | 382/236 |
| 6,057,884 A | * | 5/2000 | Chen et al. ............... | 348/416 |
| 6,075,576 A | * | 6/2000 | Tan et al. ................. | 348/425.4 |
| 6,148,026 A | * | 11/2000 | Puri et al. ................. | 375/240 |
| 6,205,260 B1 | * | 3/2001 | Crinon et al. ............. | 382/284 |
| 6,404,813 B1 | * | 6/2002 | Haskell et al. ........... | 375/240.12 |

FOREIGN PATENT DOCUMENTS

| | | | |
|---|---|---|---|
| EP | 0 577 337 | 1/1994 | ........... H04N/7/13 |
| EP | 0 880 286 | 11/1998 | ........... H04N/7/12 |
| WO | WO 97 29595 | 8/1997 | ........... H04N/7/32 |

OTHER PUBLICATIONS

Ferman et al., "Motion and shape signatures for object-based indexing of MPEG-4 compressed video", ICASSP-97, vol. 4, pp. 2601-2604, Apr. 1997.*

Brady N et al; "Context-Based Arithmetic Encoding of 2d Shape Sequences", Proceedings. International Conference On Image Processing, Oct. 26, 1997, pp. 29–32.*

* cited by examiner

*Primary Examiner*—Vu Le
(74) *Attorney, Agent, or Firm*—Kenyon & Kenyon

(57) ABSTRACT

To improve the shape coding of image sequences having differently coded VOPs with bidirectionally interpolated VOPs, the VOPs separated by a smaller time interval from the instantaneous bidirectionally interpolated VOP are used as the reference values for shape coding. This measure improves coding efficiency.

6 Claims, 6 Drawing Sheets

| Combined motion shape texture coding | |
|---|---|
| Sequence format | CIF |
| Encoding frame-rate | 10 Hz |
| Fixed Qp | 16 in I-, P- and B-VOPs |
| DC/AC prediction | ON |
| Deblocking filtering | OFF |
| M | 3 |
| Search range | 16 per coded frame |
| Quantization type | H.263 |

Tab. 1

| Akiyo | VOP1 (foreground) |
|---|---|
| Children | VOP1 (two kids) |
| Coastguard | VOP1 (patrol boat) |
| Stephan | VOP1 (player) |
| Weather | VOP1 (foreground) |

Tab. 2

Fig. 2

| Sequence | PSNR_Y [dB] VM8 | PSNR_Y [dB] NEW | Total bits / VOP VM8 | Total bits / VOP NEW | Shape bits / VOP VM8 | Shape bits / VOP NEW | Impr. in shape coding |
|---|---|---|---|---|---|---|---|
| Akiyo | 31.28 | 31.28 | 3266 | 3247 (-19) | 790.52 | 772.02 (-18.52) | 2.34% |
| Children | 26.67 | 26.67 | 9200 | 9179 (-21) | 466.73 | 446.04 (-20.69) | 4.43% |
| Coast. | 26.36 | 26.36 | 4776 | 4741 (-35) | 836.31 | 800.93 (-35.38) | 4.23% |
| Stephan | 26.36 | 26.36 | 4371 | 4367 (-4) | 871.19 | 867.87 (-4.32) | 0.50% |
| Weather | 28.84 | 28.84 | 5710 | 5685 (-25) | 858.10 | 833.10 (-25.00) | 2.91% |

Tab. 3

| Sequence | PSNR_Y [dB] VM8 | PSNR_Y [dB] NEW | Total bits / VOP VM8 | Total bits / VOP NEW | Shape bits / VOP VM8 | Shape bits / VOP NEW | Impr. in shape coding |
|---|---|---|---|---|---|---|---|
| Akiyo | 31.54 | 31.54 | 2973 | 2956 (-17) | 373.32 | 360.59 (-12.73) | 3.41% |
| Children | 26.80 | 26.80 | 9173 | 9160 (-12) | 361.34 | 348.45 (-12.89) | 3.57% |
| Coast. | 26.49 | 26.51 | 4404 | 4370 (-34) | 436.45 | 417.02 (-19.42) | 4.45% |
| Stephan | 26.57 | 26.56 | 4046 | 4035 (-11) | 521.94 | 514.56 (-7.48) | 1.43% |
| Weather | 29.28 | 29.28 | 5770 | 5710 (-60) | 434.73 | 405.29 (-19.44) | 4.47% |

Tab. 4

Fig. 3

METHOD OF IMPROVED CONTOUR CODING OF IMAGE SEQUENCES, AND APPLICATION

BACKGROUND INFORMATION

A context based arithmetic encoding CAE for binary shape coding of I (intra-frame) VOPs, P (unilaterally motion-compensated-predicted) VOPs and B (bidirectionally interpolated) VOPs (VOP=video object plane) is used in MPEG verification model version 8.0 (VM8.0), ISO/IEC JTC1/SC29/WG11, MPEG97/N1796.

FIG. 1 shows an example of a GOF (group of frames) structure in MPEG-1 standard for an image sequence composed of I-, P- and B-VOPs. VOPs coded exclusively by the intra-frame technique are labeled as I, unilaterally motion-compensated predicted VOPs are labeled as P, and the bidirectionally interpolated VOPs between them are labeled as B. The example according to FIG. 1 shows four P-VOPs per GOF and two B-VOPs between I- and/or P-VOPs. The length of the GOF is not fixed, but instead is determined by the number of different image types. One essential feature of the CAE algorithm is that a chronologically following VOP (backward reference VOP) is always used as the reference value in inter-CAE shape coding of a current B-VOP, namely for both the binary shape reference and the shape mode reference. However, since B-VOPs of a random shape sometimes access only image contents of a chronologically preceding VOP as the reference (forward reference VOP), the binary shape of this B-VOP must be coded in the same manner as an I-VOP when using the current CAE algorithm. This leads to a considerable degradation of coding efficiency with such B-VOPs.

SUMMARY OF THE INVENTION

According to the present invention, coding efficiency can be improved in particular for shape coding in bidirectionally interpolated VOPs (B-VOPs). The method according to the present invention provides time-adaptive shape coding for B-VOPs. During a context-based shape coding, a B-VOP can access either a chronologically preceding I-VOP or P-VOP (forward reference VOP) or a chronologically following I-VOP or P-VOP (backward reference VOP) as the reference value for shape coding.

In the method according to the present invention no changes in syntax are necessary and thus the method can easily be used with existing standards such as the MPEG-4 standard.

BRIEF DESCRIPTION OF THE DRAWINGS

FIG. 2 includes two Tables relating to the present invention.

FIG. 3 includes another two Tables relating to the present invention.

DETAILED DESCRIPTION

Figure 1:
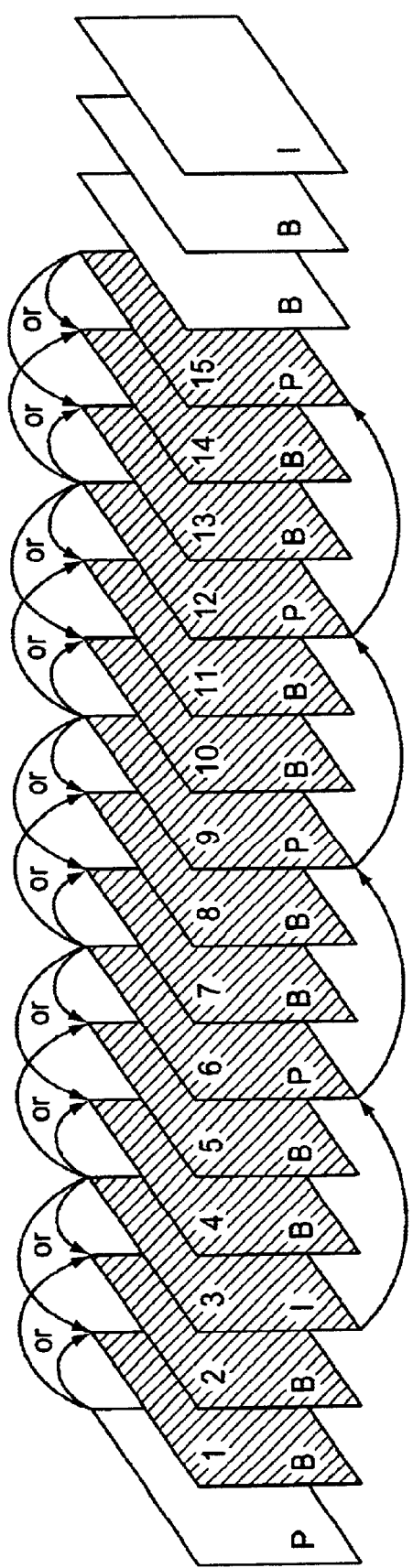
FIG. 1 shows an example of a GOF structure.

According to the present invention, differently coded VOPs of an image sequence are used, as also shown in FIG. 1. I-VOPs are VOPs coded exclusively by the intra-frame technique. P-VOPs are VOPs predicted unilaterally with motion compensation, and B-VOPs are bidirectionally interpolated VOPs. According to the present invention, during CAE shape coding, a B-VOP can access either a chronologically preceding VOP or a chronologically following VOP as the reference value which is coded according to the intra-frame technique or is unilaterally bidirectionally predicted.

Which VOP is selected as the reference value will depend on the following selection criteria:

if there is no chronologically preceding (forward) I-VOP or P-VOP or if there is no chronologically following (backward) I-VOP or P-VOP for a current bidirectionally interpolated VOP, the available (forward/backward) I-VOP or P-VOP is selected as the reference value for binary shape coding and the shape mode reference value according to the CAE shape coding method;

if both a forward and a backward VOP are available as the reference value, the VOP (I-VOP or P-VOP) having the smaller interval from the respective current bidirectionally interpolated B-VOP is selected as the binary shape reference value and the shape mode reference value;

if the current B-VOP is separated by the same interval from the forward reference VOP and the backward reference VOP, one of these two VOPs is always selected as the reference value, preferably the chronologically following VOP (backward VOP).

Let us assume there is an image sequence having a random shape with B0 as the first VOP and B7 as the last VOP, e.g.

| B0 | B1 | I2 | B3 | B4 | P5 | B6 | B7 |
|----|----|----|----|----|----|----|-----|

Then according to the selection criteria given above, B0 and B1 will access I2 (intra) as the reference VOP because there is no forward reference VOP. B3 accesses I2 because it is separated from I2 by a smaller interval than that from P5. B4 takes (predicts) P5 as the reference VOP because from a chronological standpoint it is the next I-VOP or P-VOP. B6 and B7 also have P5 as a reference VOP because no backward VOP is available.

In comparison with the CAE algorithm used in the past, the time-adaptive shape coding method according to the present invention has more efficient binary shape coding with B-VOPs because inter-CAE shape coding is allowed even when no backward reference VOP is available. In addition, there is normally a greater correlation between two VOPs separated by a smaller interval, so the selection of a reference VOP which is separated from the current B-VOP by a smaller interval greatly improves the shape coding efficiency.

The method according to the present invention is supported completely by the MPEG-4 CAE algorithm. The VOP time instance is described in the VOP layer as "modulo time base" and "VOP time increment" (see also the description in this regard in German Patent Application No. 197 35 607.9), and "VOP coded" indicates whether or not a VOP is available. Therefore, no change in syntax is necessary in comparison with the MPEG-4 standard. In this way the MPEG-4 shape decoding process is modified according to the selection criteria given above in selecting the reference VOP for an instantaneous B-VOP.

The effect of the method according to the present invention on coding efficiency is explained below on the basis of simulations with test image sequences. MoMuSys software VMB-971016 was used. The most important coding parameters are listed in Table 1, where Qp indicates the quantification step height as a constant quantity, i.e., without rate adjustment, and M indicates the repeat sequence of the I-VOPs and P-VOPs. For M=3, every third VOP of an image sequence is an I-VOP or a P-VOP, with B-VOPs in between. Table 2 shows five test image sequences (video objects) for the simulations performed. Each sequence has 100 coded frames. Only the first frame is intra-frame coded (I-VOP). With M=3 the sequence is represented in order of display as

| I | B* | B | P | B* | B | P | B* | B | P | B* | B | P. |
|---|----|---|---|----|---|---|----|---|---|----|---|----|

In shape coding, the B-VOPs marked with an asterisk are coded differently from the VM8.0 CAE algorithm, because they access the forward reference VOPs as the reference value, while the other B-VOPs are coded as in the VM algorithm. Therefore, it should be pointed out that the improvements described below are based on the B-VOPs marked with an asterisk.

Tables 3 and 4 show experimental results in cases of lossless and lossy shape coding with a 10% reconstruction loss, for example. Table 3 shows the lossless case and Table 4 shows the lossy case. The first column shows the image sequences. The next two columns show the peak signal-to-noise ratio PSNR for coding according to VM8 and by the method according to the present invention (NEW).

The last column shows the improvement in structure coding in percentage according to the present invention. When using the method according to the present invention, up to a 10% reduction in bit rate can be achieved in shape coding. In lossy shape coding the method according to the present invention not only increases the shape coding efficiency but also slightly increases the motion and texture coding efficiency. This is due to the fact that the total bit reduction in Table 4 including shape coding, motion coding and texture coding is greater than the bit reduction in shape coding alone.

As mentioned above, the improvement comes about due to the B-VOPs marked with an asterisk. Therefore, considering only the B-VOPs marked with an asterisk in binary shape coding permits a further bit rate reduction of up to about 30%.

Figure 4:
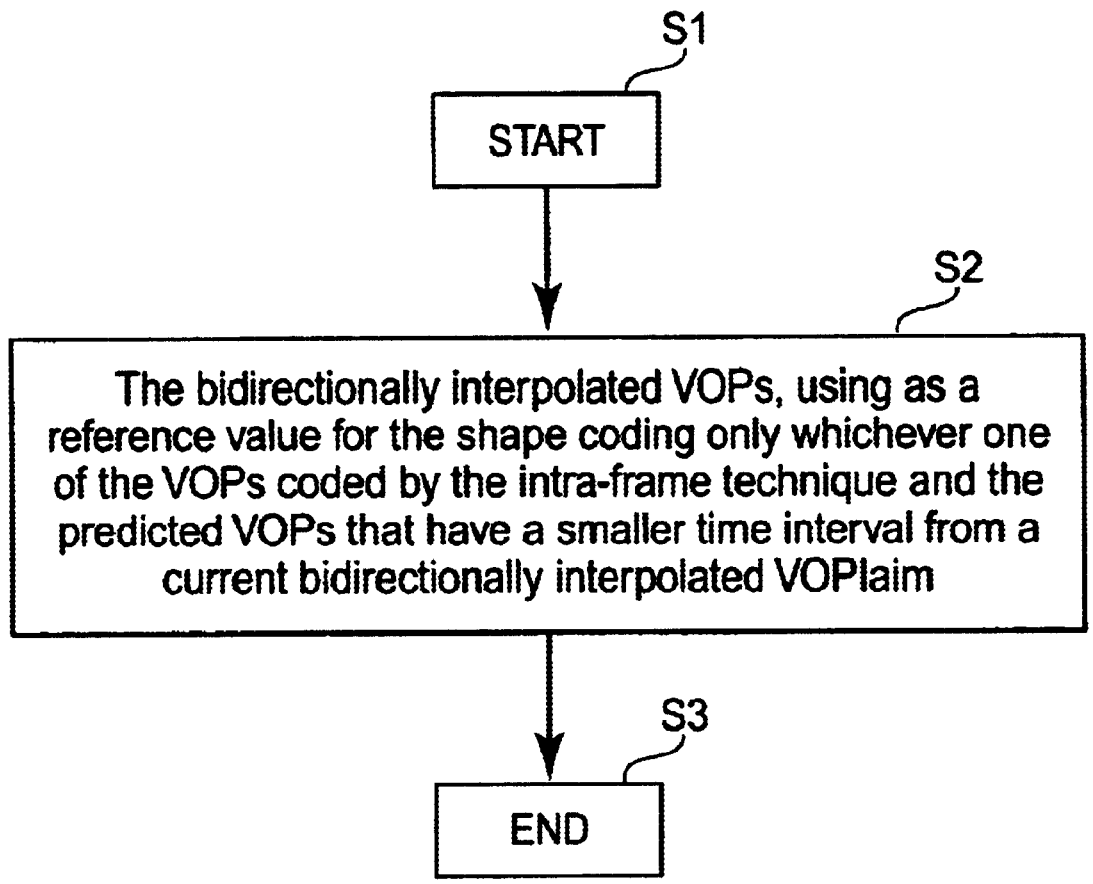
FIG. 4 is a first flow diagram relating to the present invention.
Figure 5:
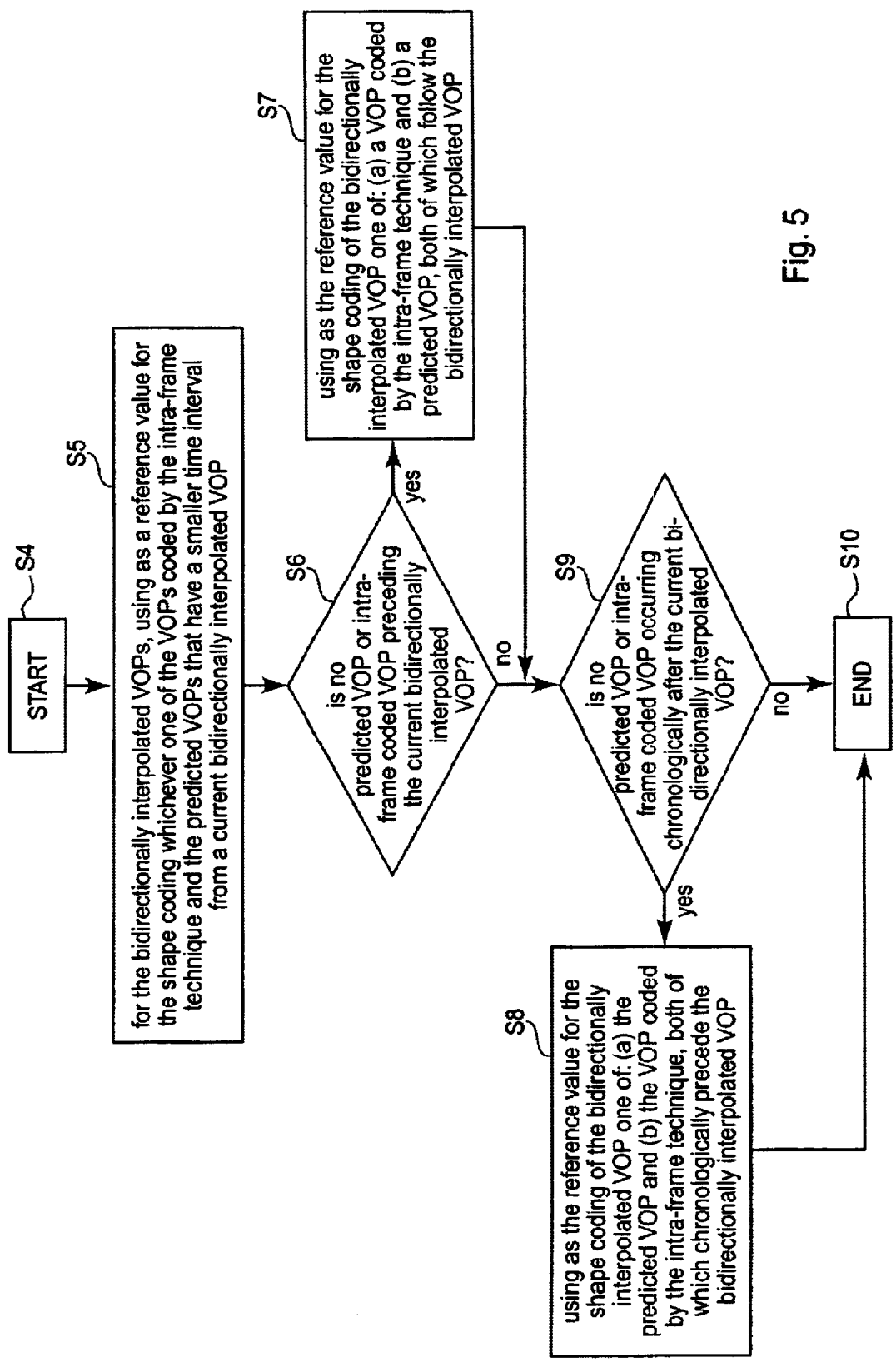
FIG. 5 is a second flow diagram relating to the present invention.
Figure 6:
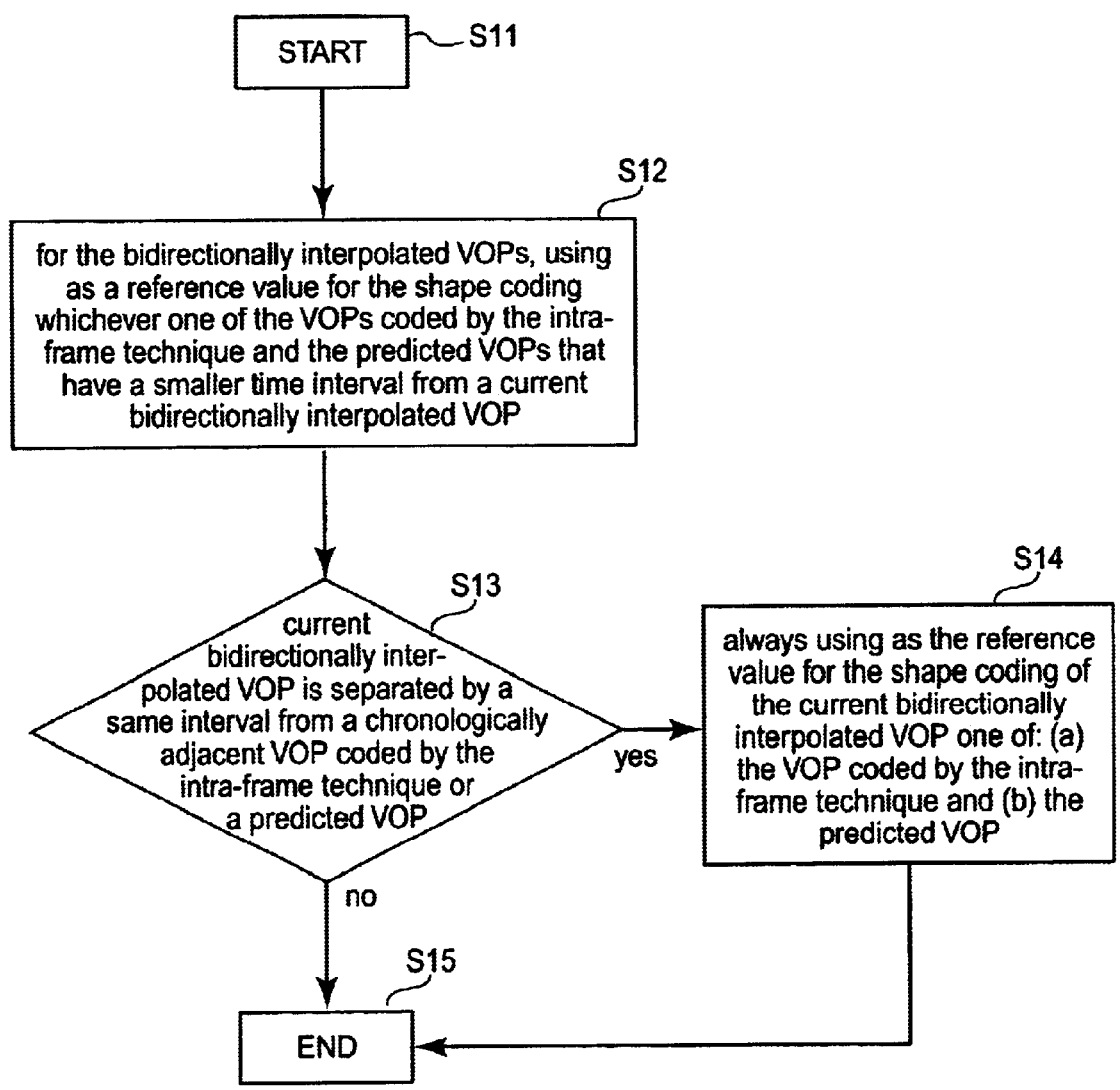
FIG. 6 is a third flow diagram relating to the present invention.

FIGS. 4–6 show various flow diagram relating to the present invention. Step S2 of FIG. 4 shows that for the bidirectionally interpolated VOPs, what is used as a reference value for the shape coding is only whichever one of the VOPs coded by the intra-frame technique and the predicted VOPs have a smaller time interval from a current bidirectionally interpolated VOP.

FIG. 5 presents another flow diagram relating to the present invention. In step S5, for the bidirectionally interpolated VOPs, what is used as a reference value for the shape coding is whichever one of the VOPs coded by the intra-frame technique and the predicted VOPs have a smaller time interval from a current bidirectionally interpolated VOP. If there is no predicted VOP or intra-frame coded VOP preceding the current bidirectionally interpolated VOP (step S6), then what is used as the reference value for the shape coding of the bidirectionally interpolated VOP is one of: (a) a VOP coded by the intra-frame technique and (b) a predicted VOP, both of which follow the bidirectionally interpolated VOP (step S7). If there is no predicted VOP is intra-frame coded VOP occurring chronologically after the current bidirectionally interpolated VOP (step S9), then what is used as the reference value for the shape coding of the bidirectionally interpolated VOP is one of: (a) the predicted VOP and (b) the VOP coded by the intra-frame technique, both of which chronologically precede the bidirectionally interpolated VOP (step S8).

FIG. 6 presents another flow diagram according to the present invention. In step S12, for the bidirectionally interpolated VOPs, what is used as a reference value for the shape coding is whichever one of the VOPs coded by the intra-frame technique and the predicted VOPs have a smaller time interval from a current bidirectionally interpolated VOP. If the current bidirectionally interpolated VOP is separated by a same interval from a chronologically adjacent VOP coded by the intra-frame technique or a predicted VOP (step S13), one of: (a) the VOP coded by the intra-frame technique and (b) the predicted VOP is always used as the reference value for the shape coding of the bidirectionally interpolated VOP (step S14).

What is claimed is:

1. A method of improving a shape coding of image sequences having VOPs coded by an intra-frame technique, predicted VOPs and bidirectionally interpolated VOPS, comprising the step of:

for the bidirectionally interpolated VOPs, using as a reference value for the shape coding only whichever one of the VOPs coded by the intra-frame technique and the predicted VOPs that have a smaller time interval from a current bidirectionally interpolated VOP.

2. The method according to claim 1, further comprising the step of:

decoding MPEG-4 shape coded VOPs.

3. The method according to claim 1, further comprising:

performing an inter-CAE shape coding on the current bidirectionally interpolated VOP when no chronologically following VOP is available.

4. A method of improving a shape coding of image sequences having VOPs coded by an intra-frame technique, predicted VOPs and bidirectionally interpolated VOPs, comprising the step of:

for the bidirectionally interpolated VOPs, using as a reference value for the shape coding whichever one of the VOPs coded by the intra-frame technique and the predicted VOPs that have a smaller time interval from a current bidirectionally interpolated VOP;

if there is no predicted VOP or intra-frame coded VOP preceding the current bidirectionally interpolated VOP, using as the reference value for the shape coding of the bidirectionally interpolated VOP one of: (a) a VOP coded by the intra-frame technique and (b) a predicted VOP, both of which follow the bidirectionally interpolated VOP; and if there is no predicted VOP or intra-frame coded VOP occurring chronologically after the current bidirectionally interpolated VOP, using as the reference value for the shape coding of the bidirectionally interpolated VOP one of: (a) the predicted VOP and (b) the VOP coded by the intra-frame technique, both of which chronologically precede the bidirectionally interpolated VOP.

5. A method of improving a shape coding of image sequences having VOPs coded by an intra-frame technique, predicted VOPs and bidirectionally interpolated VOPs, comprising the step of:

for the bidirectionally interpolated VOPs, using as a reference value for the shape coding whichever one of the VOPs coded by the intra-frame technique and the predicted VOPs that have a smaller time interval from a current bidirectionally interpolated VOP; and if the current bidirectionally interpolated VOP is separated by a same interval from a chronologically adjacent VOP coded by the intra-frame technique or a predicted VOP, always using as the reference value for the shape coding of the current bidirectionally interpolated VOP one of: (a) the VOP coded by the intra-frame technique and (b) the predicted VOP.

6. The method according to claim 5, wherein the reference value is one of: (a) the VOP coded by the intra-frame technique chronologically following the current bidirectionally interpolated VOP and (b) the predicted VOP.

* * * * *